United States Patent [19]

Spinner

[11] 3,792,444

[45] Feb. 12, 1974

[54] DATA COMMUNICATION SYSTEM

[76] Inventor: Robert E. Spinner, 26 Deer Trail Rd., North Caldwell, N.J. 07036

[22] Filed: Sept. 18, 1972

[21] Appl. No.: 290,120

[52] U.S. Cl. ............ 340/172.5, 340/309.4, 340/325

[51] Int. Cl. ............ G08b 5/00

[58] Field of Search ..... 340/172.5, 309.4, 325, 365, 340/381

[56] References Cited

UNITED STATES PATENTS

| | | | |
|---|---|---|---|
| 3,680,084 | 7/1972 | Franklin et al. | 340/309.4 |
| 3,255,442 | 6/1966 | Kimberlin | 340/309.4 |
| 3,361,875 | 1/1968 | Banfalvi et al. | 340/365 |
| 3,508,255 | 4/1970 | Hackett et al. | 340/325 |
| 3,408,623 | 10/1968 | Wagner | 340/309.4 |
| 2,180,908 | 11/1939 | Nevinger | 340/309.4 |
| 3,353,172 | 11/1967 | Beilfuss | 340/309.4 |
| 3,041,596 | 6/1962 | Caferro et al. | 340/309.4 |
| 3,614,765 | 10/1971 | Huber | 340/325 |
| 3,220,000 | 11/1965 | Lesage | 340/381 |

*Primary Examiner*—Gareth D. Shaw
*Assistant Examiner*—Mark Edward Nusbaum

[57] ABSTRACT

The system includes a case having a plurality of display portions, each of which can display a unit of information in a predetermined sequence. The system also includes a keyboard for generating said numerical units of information, a counter for controlling the sequencing of the display portions, and a shift register for storing the units of information before entering them on tape. The counter is connected to sequence through the various display portions serially and to lock at two selected display portions which are operated back and forth along with the proper associated units of information.

The system also includes means for reading back the stored information from the tape and for transmitting the information to a remote computer or other data center.

13 Claims, 4 Drawing Figures

DATA COMMUNICATION SYSTEM

BACKGROUND OF THE INVENTION

The present invention relates to apparatus which can be used to display and store, and transmit to a computer or other data collector, information of various types. For example, the apparatus can be used to display and store a series of electrical information units, comprising first a store location and the salesman servicing that store, then a series of articles and the quantities thereof to be shipped to the store. Other types of information units can be displayed and stored through proper modification of the system.

Apparatus is known for displaying and storing units of information of the general type described above. However, such apparatus does not have the versatility and flexibility of the apparatus of the invention, and, among other things, it cannot automatically display, enter on tape, and sequence format units and associated data.

DESCRIPTION OF THE DRAWINGS

FIG, 1 is a plan view of a housing for carrying the system of the invention.

DESCRIPTION OF THE PREFERRED EMBODIMENTS

In the system of the invention 10, it is assumed, for purposes of illustration, that positive logic is employed unless indicated otherwise. That is, the logic circuits such as AND and OR circuits, for example, are operated by positive signal levels at the input to provide a positive signal level at the output. Mechanically, the system 10 can be packaged in at least two parts, one of which can contain the bulk of the electronic circuitry, with the keyboard and displays being packaged in a second smaller portion which can be hand-held. Alternatively, the total system can be mounted in a single package which, for example, can be operated on a table top.

Figure 1:
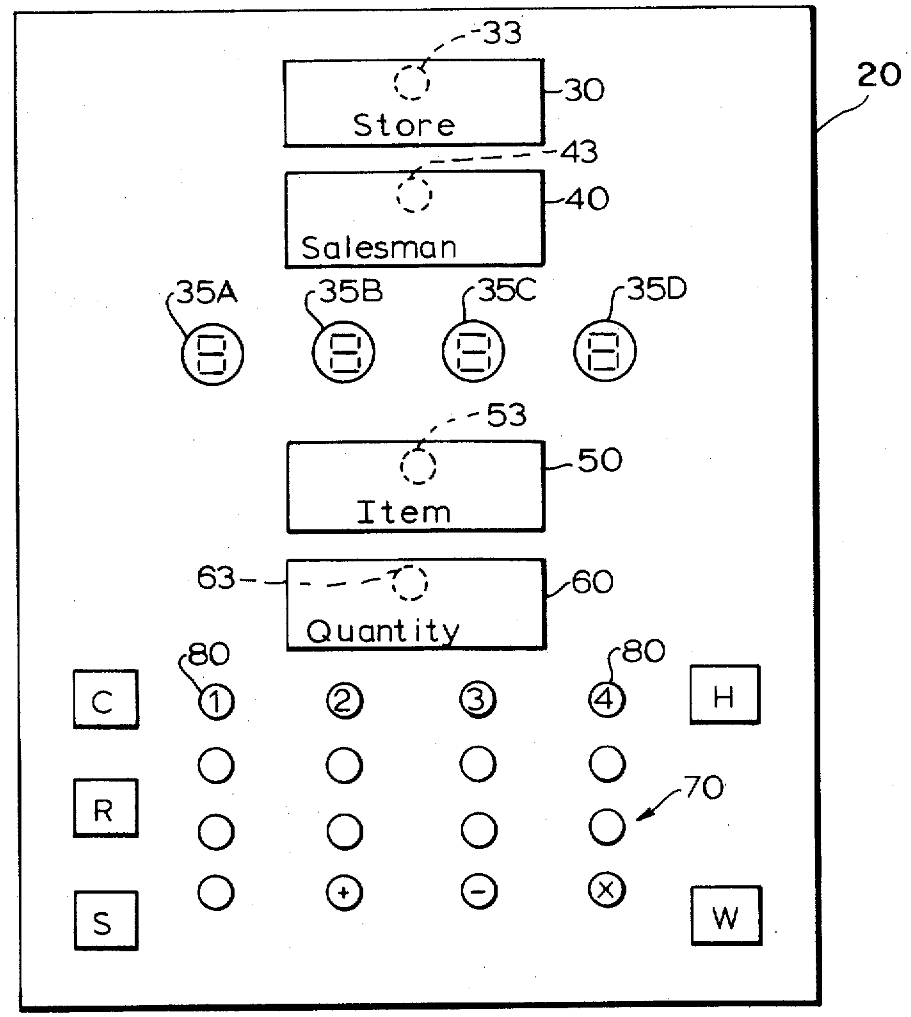

Referring to FIG. 1, the system 10 includes a case 20 of plastic, metal, or the like which, as noted above, can contain all or a portion of the system circuitry. In one embodiment of the invention, the case includes four transparent windows 30, 40, 50, 60, each of which carries a message. The windows may comprise pieces of glass, pieces of photographic film on suitable carriers, or the like, behind each of which is positioned an incandescent lamp 33, 43, 53, 63, or the like, represented schematically in FIG. 1.

In a preferred layout, the windows 30 and 40 are vertically aligned one beneath the other. In one embodiment of the invention, the first window 30 carries the legend "store", the second 40 carries the legend "salesman", the third 50 carries the legend "item", and the fourth 60 carries the legend "quantity", and each legend is lit up as its associated lamp is turned on. The case 20 carries a group of display devices 35 (A, B, C, D) suitably positioned for displaying numbers and/or letters, or the like associated with each window. In one arrangement, the display devices are disposed between windows 40 and 50. The displays 35 are preferably segmented semiconductor devices known as LED displays; however, other displays such as NIXIE tubes or the like could be used. In addition, substantially any desired number of such display devices could be provided; however, only four are shown and described.

The case 20 also carries a number of control keys or buttons as required, key C being used to generate clear or reset signals, key S being used to generate stop signals, key H being used to generate header signals, key W being used to generate write signals, and key R being used to generate read and transmit signals. The case 20 also carries a keyboard 70 comprising character keys 80, sixteen in number in this embodiment of the invention, for generating data in the form of numbers, letters, control codes, or the like.

Figure 2:
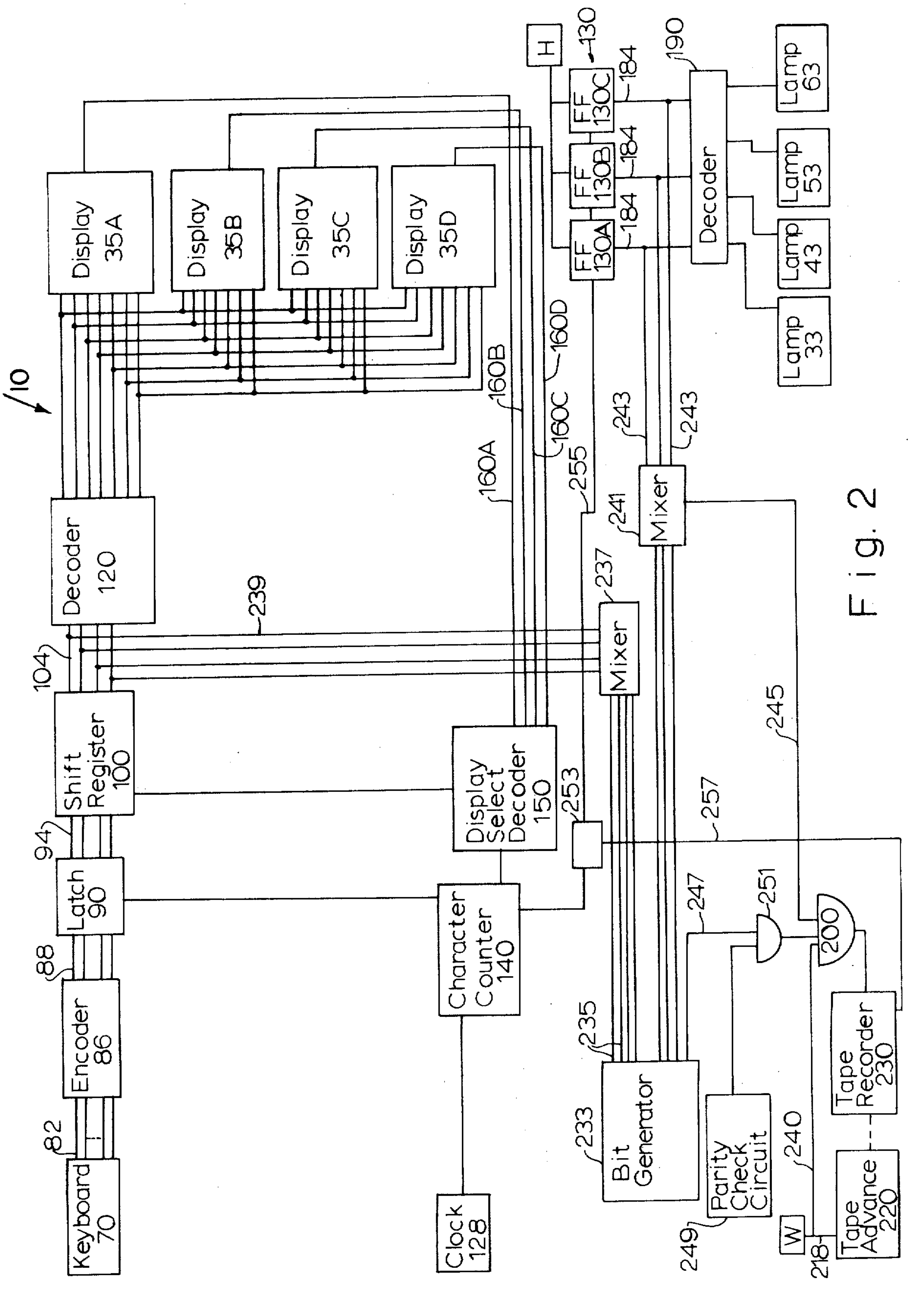
FIG. 2 is a block diagram of the electronic apparatus for the invention.

Referring to FIG. 2 in system 10, each character key 80 is coupled by a line 82 into an encoder 86, the output of which is a four-bit binary-coded decimal signal for each key 80. The output of the encoder is fed on four lines 88 to a four-bit buffer or latch 90, and the output of the latch feeds on data lines 94 into a circulating shift register 100. The button C is coupled to the shift register 100 and is used to clear or reset the register to a zero or starting state.

The output of the shift register module 100 is coupled on four lines 104, for the four-bit logic, into a display decoder 120 which converts the four-bit data input to a form suitable for driving the displays 35. If segmented displays are used, the decoder output is on seven lines 124, each of which is connected to the same corresponding character in each display device 35, as is well known in the art of multiplexing display devices.

The system 10 includes a clock 128 which is coupled both to the shift register 100 and to a character counter 140 which is coupled both to the latch circuit 90 and to a display select decoder 150. The latter decoder has four output lines 160, each of which is coupled to, and is adapted to apply power to, and energize, one display device 35.

The inter-relationship is such that, as each character is fed into the circulating shift register 100 and the corresponding data signals appear at the output of decoder 120, the clock 128 and character counter 140 set the display select decoder 150 to apply power to the proper display device 35.

System 10 includes a header format display circuit 130 which is a binary counter comprising three flip-flops 130 A, B, and C. The header key H is coupled by lead 170 to each of the flip-flops and is used to set the counter 130 to its zero state. The write key W is also coupled by lead 180 to the input of the counter circuit 130, for coupling input or counting pulses thereto, and an output line 184 from each position of the counter 130 is connected to a decoder 190 and to an OR gate 200 for a purpose to be described. The decoder circuit 190 has an output lead 210 for each lamp associated with the windows 30, 40, 50, 60, with line 210A being connected to lamp 33, line 210B to lamp 43, line 210C to lamp 53, and line 210D to lamp 65.

The three flip-flops of counter 130 are connected so that they are set to zero state by header key H, and each input pulse, initiated by key W, switches the flip-flop from one state to the next and provides different combinations of binary bits at each state. However, the second and third positions of flip-flops are interconnected so that the counter continually switches back and forth between its second and third positions, with each write pulse, until the header key H is pressed to reset the flip-flop counter to its starting state.

The system 10 includes a tape recorder 230 for recording information, and the write key W is connected by lead 218 to a tape advance mechanism 220 for properly advancing the tape recorder 230 during a write operation, to be described, in which information is transferred from the shift register to tape. The OR gate 200 is provided to control the write operation, and has one input coupled to the write key by lead 240, another input coupled to an output of the shift register 100 by lead 250, and a third input coupled to the output of the header counter 130.

System 10 also includes means for controlling and properly sequencing the feeding of information bits from the shift register 100 and from the header counter 130 to the tape recorder 230. This means includes a bit generator 233 coupled to the output of the clock 128 and adapted to generate eight control bits sequentially on lines 235. A mixing circuit 237, which may comprise, for example, four AND gates, has a connection 239 to each of the output lines 104 from the shift register and to the first four output lines 235 from the bit generator. A similar mixing circuit 241 is coupled by leads 243 to each of the outputs 184 from the header flip-flops 130 and to the next three outputs 235 of the bit generator 233. The outputs of the two mixer circuits are connected to an input of OR gate 200 by lead 245. A parity bit output on lead 247 from the bit generator is coupled with the output of a parity checking circuit 249 through an AND gate 251 to an input to OR gate 200. In operation of this portion of the system, the bit generator 233 generates the eight noted signal bits sequentially, and the first four control the flow of the information bits from the shift register through mixer 237 and the OR gate 200 to the tape recorder. The three subsequent bits control the passage of the header count bits through the mixer 241 and the OR gate to the tape recorders.

The key C is used to reset all of the modules of system 10, and the stop key S is used to stop operation of the system by stopping clock 128.

In operation of the system 10, the system is reset by means of key C, if necessary, and the header key H is pressed to set the header flip-flop counter 130 to its starting state or orientation. In this starting orientation, an output signal appears on line 210A of the decoder 190, and this turns on lamp 33 associated with the first display window 30 in the case 20. Thus, the first window is lighted, and the legend "store" is displayed. Next, a character key 80 is pressed to enter the first digit of the number to be displayed in display devices 35 in association with window 30. When the first key 80 is depressed, a signal flows on the associated line 82 through the encoder 86, the output of which is a four-bit signal which is fed into the four-bit latch 90. Under the control of the clock 128 and the character counter 140, the four-bits representing the first character are fed into the circulating shift register 100 and into the decoder 120 to produce the corresponding seven-bit signal on the display input lines 124. At the same time, the output of the character counter, acting through the display selector decoder 150, selects and energizes the first display device 35 in which the first character is to be displayed, and the character is so displayed. If a second character is to be displayed for window 30, another key 80 is depressed and a second signal flows through the encoder 86 and latch 90 and, under the control of the clock 128 and character counter 140 into the circulating shift register 100 and then into the decoder 120 and onto the display lines 124. Under the control of the display selector decoder 150, the second display device 35B is energized to receive and display the second character. The same procedure is carried out for third and fourth characters if such are to be entered for the first window. Thus, in the described arrangement, the "store" designations are displayed by up to four numbers or letters or the like.

It is noted that the shift register circulates and applies the information bits to the display devices 35 sequentially at such a rate that an apparently stationary display of characters is presented.

Now, the write button W is pressed to enter on tape the first units of information which have been entered in displays 35 and which designate the "store".

The sequence of events which take place during a write operation are as follows:

1. Tape is advanced to data-receiving position.
2. OR gate 200 is enabled.
3. Data bits are fed through OR gate 200 from shift register 100.
4. Status bits from counter 130 are fed through OR gate 200.
5. Counter 130 is shifted to light next window.
6. Tape recorder is stopped. Thus, when the write button is pressed, a signal on line 218 operates the tape advance mechanism 200 to move the tape in the tape recorder 230 into position to receive information. Similarly, a signal on line 240 is coupled to the OR gate 200. Next, under the control of a clock 128, bit generator 233, and mixer circuit 237, the data bits of the words in the shift register are fed serially from mixer 237 on line 245 through the gate 200 and into the tape recorder. Then, the header bits are fed serially from mixer 241 on lead 245 through the gate 200 and into the tape recorder. A "write complete" signal is generated by suitable circuitry represented by block 253 when the signal bits have been entered on tape, and a signal input is coupled on line 255 to the header counter 130 to shift the counter to its next state, and the tape recorder is stopped by a signal on line 257. It is noted that, when the data bits are fed from the shift register to the tape recorder, they are removed from the displays 35.

As noted, at the end of the write operation, header counter 130 is shifted to its next operating state, in which the decoder 190 provides an output signal on lead 210B and lights up the second lamp 43 in the second window 40 which designates the "salesman". Now, the keys 80 are operated to enter the proper character designation for the "salesman" into the shift register 100 and displays 35, and, when the write key W is pressed, this information is fed out of the shift register through OR gate 200 to the tape recorder, in the manner described above.

At the end of this second write operation, the header circuit 130 switches to its third state, in which the output of decoder 190 lights up the third window 50, designating "item", and the keys 80, to designate characters, are pressed to enter information into the shift register 100 and displays 35. Now again, the write button W is pressed to feed this information to the tape where it is recorded, and thereafter the header is switched to its fourth state, in which an output on lead 210D lights lamp 63 in the fourth window 60 and the legend "quantity" is displayed. The proper "quantity" characters are then entered by means of keys 80 into the shift register 100 and display devices 35, and then it is transferred to the tape. At the end of this operation, because of the manner in which the flip-flops of counter 130 are connected, the counter is switched back to its previous state in which an output appears on line 210C and lamp 53 to light up the "item" designation window. The character designation is then entered in lights 35 and then into the tape, and the counter 130 is switched to its fourth state, and the fourth "quantity" window is lighted. The "quantity" number is then entered in displays 35 and into the tape. This operation is continued, entering alternate "item" and "quantity" information, as required. The operator can now repeat the entire operation for another "store", and this is begun by pressing the header button H to reset the counter 130 to its zero state and repeating the steps described above.

Figure 3:
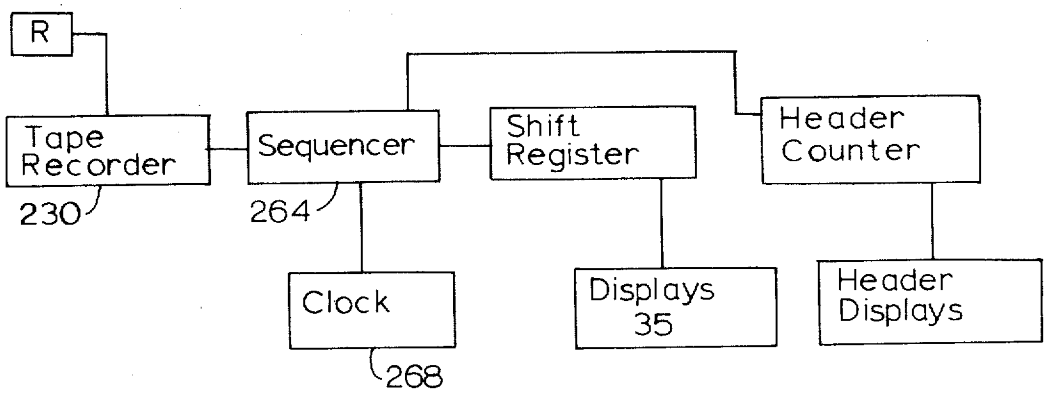
FIG. 3 is a block diagram of a portion of the system of the invention.

To read back and check the data which has been entered on tape, the following procedure is performed, the procedure being essentially the same as that described above, except that the tape is the input to the system. Some of the elements of the read system are illustrated in FIG. 3. The tape, of course, is rewound to the beginning of the recorded data, and it is turned on and the recorded information is read by the usual tape recorder circuitry. By means of suitable steering or sequencing circuitry 264, and under the control of a slow clock 268, the data bits, which are read first, are fed into the circulating shift register and displays 35, and then the signal bits for driving the header counter are applied to the header counter 130, and the output thereof turns on light 33 behind the first window 30. Then the next group of data bits are entered in the circulating shift register and through the associated encoder to the display devices 35, and the bits for counter 130 are applied thereto to turn on the second light 43 and the second window. As the taped information is read, the data bits appear in displays 35, and the associated window is lighted up in the same order as it was originally recorded.

The usual decoders, encoders, and the like are not shown in FIG. 3, but they can be readily provided by those skilled in the art in view of the teaching herein.

Figure 4:
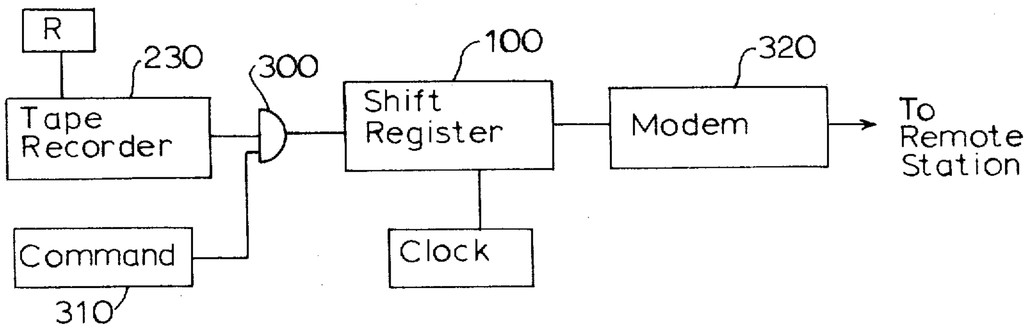
FIG. 4 is a block diagram illustrating another portion of the system of the invention.

The information recorded on the tape may also be transmitted to a remote station including a computer or the like over telephone lines or the like. This operation is essentially the same as the first described data display and write operation. A typical arrangement of some of the circuit elements is illustrated in FIG. 4 and includes coupling of the read key R to the tape recorder 230 and from the read circuitry thereof to an AND gate 300, to which is also coupled a COMMAND signal source 310 which generates a suitable signal to initiate the transmitting operation. The output of the AND gate 300, which comprises all of the information bits on the tape, is transmitted to the shift register 100, and, after all data has been entered therein, it is clocked through a suitable MODEM 320 to a remote station. The transmitted information preferably includes all necessary bits such as start bits, parity check bits, and stop bits, in addition to the above-described information bits and header bits. The provision of such control and synchronizing bits is well known in the art and need not be described in detail.

It is to be understood that modifications may be made in the specific embodiments of the invention described herein and within the scope of the invention. For example, other memory modules than a circulating shift register may be employed. Also, the number of flip-flops used in the header counter 130 can be varied in accordance with the requirements and desired flexibility of the system. Two flip-flops could be used in the system illustrated herein; however, three provides facility for enlargement of the system.

Other modifications which may be made include providing either in place of, or in addition to, the keyboard, other sources of information such as a light pen, optical reading apparatus, a measuring instrument such as an external clock, a scale, or the like. In addition, an internal or external calculator might provide a source of data. In another modification, the tape recorder could be replaced by another type of memory includes in the system 10. Other similar modifications will occur to those skilled in the art.

The individual circuit elements or modules which make up the system of the invention can be readily assembled from known and available apparatus or can be readily built by those skilled in the art. For purposes of illustration, decoder 120 may be a Monsanto MSD 102 seven segment decoder driver, which is described in the "Monsanto Electronic Special Products Catalog," pages 49, 50, Apr. 26, 1971 and which is made as an integrated circuit; display decoder 150 may be a Fairchild 93L01 decoder, as shown in the "Fairchild MSI TTL Catalog," 1970–1971, bit generator 233, mixer 237, and sequencer 264 are described in "Fairchild Application Note APP. 85/2" of November 1965 entitled "Micrologic Shift Counters"; parity check circuit 249 may be derived from the article "Technical Codes: The Language of Machines" by John H. Bickford, printed in "Machine Design" magazine on pages 111 and 112; and tape advance 220 may be a "Series 74" 74L20 four input NAND gate which may be found in Fairchild 54/74 TTL catalog of October 1970.

What is claimed is:

1. Data communication apparatus comprising a case comprising a housing, a plurality of windows in said case, each carrying a legend, light-producing means behind each window for lighting up and thus displaying the legend associated with that window, an array of display devices disposed adjacent to said windows for displaying characters in association with the legend displayed in each of said windows, a source of data information representing characters and energizable so that characters can be displayed in said display devices, first circuit means coupled between said source of data and said display devices for entering the character represented by said source, said first circuit means including a circulating shift register which stores signal bits representative of said characters and a decoder for coupling said signal bits to said display devices from said shift register, said shift register also being coupled through logic circuits to a tape recorder for recording said signal bits stored in said shift register, and second circuit means coupled to said legend-displaying means at each window for displaying said window legends one at a time in a series, with each window legend being displayed separately along with an associated display of data in said display devices.

2. The apparatus defined in claim 1 wherein said second means includes a multi-position counter.

3. The apparatus defined in claim 1 wherein said second circuit means includes a flip-flop counter.

4. The apparatus defined in claim 1 wherein said second circuit means includes a flip-flop counter comprising a plurality of flip-flops, at least two of said flip flops being interconnected so that successive input counting pulses to said counter cause said counter to flip back and forth between said two flip-flops until the counter is reset to its starting state.

5. The apparatus defined in claim 1 and including a first signal-storage means coupled through signal processing circuits to said source of data information, a flip-flop counter having its outputs coupled through signal processing circuits to said legend-displaying means at each said window, a second signal-storage means, and a sequencing circuit coupled to the output of said first signal-storage means and the output of said flip-flop counter for sequentially feeding information held in said first storage means and the information represented by the state of said counter to said second storage means.

6. The apparatus defined in claim 5 and including a transmission path from said second storage means through signal processing and sequencing circuits to said first storage means and said counter to display in said windows and in said display devices the information stored in said second storage means.

7. The apparatus defined in claim 6 and including circuit means coupled to the output of said shift register for transmitting the information stored therein to a remote station.

8. Data communication apparatus comprising a case comprising a housing, a plurality of windows in said case, each carrying a legend, a lamp behind each window for displaying the legend associated with that window, an array of display devices positioned adjacent to said windows for displaying characters in association with each of said windows, a keyboard in said case including an array of keys representing characters to be displayed in said display devices, first circuit means coupled between said keys and said display devices for entering the character represented by said keys, said first circuit means including a circulating shift register which stores signal bits representative of said characters and a decoder for coupling said signal bits to said display devices from said shift register, said shift register also being coupled through logic circuits to a tape recorder for recording said signal bits stored in said shift register, and second circuit means including a counter circuit to said legend-displaying means at each window for displaying said window legends one at a time in a series.

9. The apparatus defined in claim 8 wherein said means associated with each window is a light-producing lamp.

10. The apparatus defined in claim 8 wherein said counter circuit includes a flip-flop counter.

11. The apparatus defined in claim 8 wherein said counter circuit includes a flip-flop counter comprising a plurality of flip-flops, at least two of said flip-flops being interconnected so that successive input counting pulses cause said counter to flip back and forth between said two flip-flops until the counter is reset to its starting state.

12. The apparatus defined in claim 8 wherein said counter of said second circuit means comprises a series of flip-flops and including means for setting said counter to a starting state and input means for feeding counting pulses to said counter, at least two of said flip-flops being interconnected so that after a predetermined number of input pulses have switched said counter from one position to the next, subsequent input pulses cause said two flip-flops to switch back and forth until the counter is reset to its starting state.

13. The apparatus defined in claim 8 and including a decoder coupled to the output of said counter for energizing said means associated with each window for displaying the legend therein.

* * * * *